US012744377B2

(12) United States Patent
Huang et al.

(10) Patent No.: US 12,744,377 B2
(45) Date of Patent: Sep. 22, 2026

(54) ELECTROSTATIC DISCHARGE PROTECTION CIRCUIT

(71) Applicant: Vanguard International Semiconductor Corporation, Hsinchu (TW)

(72) Inventors: Yeh-Jen Huang, Hsinchu City (TW); Jian-Hsing Lee, Hsinchu City (TW); Li-Yang Hong, Kaohsiung City (TW); Yeh-Ning Jou, Taoyuan City (TW)

(73) Assignee: VANGUARD INTERNATIONAL SEMICONDUCTOR CORPORATION, Hsinchu (TW)

( * ) Notice: Subject to any disclaimer, the term of this patent is extended or adjusted under 35 U.S.C. 154(b) by 157 days.

(21) Appl. No.: 18/808,483

(22) Filed: Aug. 19, 2024

(65) Prior Publication Data

US 2026/0051731 A1 Feb. 19, 2026

(51) Int. Cl.
*H02H 9/04* (2006.01)

(52) U.S. Cl.
CPC .................................. *H02H 9/045* (2013.01)

(58) Field of Classification Search
CPC .......... H02H 9/04; H02H 9/045; H02H 9/046; H03K 17/082; H03K 17/081; H01L 27/02; H01L 27/0266; H01L 27/0288; H01L 49/02; H01L 29/20
USPC ........................................................ 361/56
See application file for complete search history.

(56) References Cited

U.S. PATENT DOCUMENTS

| | | | | |
|---|---|---|---|---|
| 2018/0026029 | A1 | 1/2018 | Lin et al. | |
| 2019/0237456 | A1 | 8/2019 | Lai et al. | |
| 2023/0155375 | A1* | 5/2023 | Lee | H10D 89/811 361/56 |
| 2023/0403001 | A1* | 12/2023 | Lai | H03K 17/08122 |

FOREIGN PATENT DOCUMENTS

| | | | |
|---|---|---|---|
| TW | I775635 | B | 8/2022 |

OTHER PUBLICATIONS

Taiwanese Office Action and Search Report for Taiwanese Application No. 113123302, dated Mar. 25, 2025.

* cited by examiner

*Primary Examiner* — Danny Nguyen
(74) *Attorney, Agent, or Firm* — Birch, Stewart, Kolasch & Birch, LLP

(57) ABSTRACT

An electrostatic discharge (ESD) protection circuit protecting a core circuit and including a first high electron mobility transistor (HEMT), a second HEMT, a first current clamping circuit, a second current clamping circuit, and a resistor is provided. The first HEMT is coupled to a first input terminal. The second HEMT is coupled between the first HEMT and a second input terminal. The first current clamping circuit includes a third HEMT. The third HEMT is coupled between the gate of the first HEMT and the second input terminal. The second current clamping circuit is coupled between the first input terminal and the gate of the second HEMT. The resistor is coupled between the first input terminal and the core circuit. The core circuit is coupled to the second input terminal.

18 Claims, 11 Drawing Sheets

ELECTROSTATIC DISCHARGE PROTECTION CIRCUIT

BACKGROUND OF THE INVENTION

Field of the Invention

The present invention relates to an electronic circuit, and, in particular, to an electrostatic discharge (ESD) protection circuit.

Description of the Related Art

As the semiconductor manufacturing process develops, electrostatic discharge (ESD) protection has become one of the most critical reliability issues with integrated circuits (IC). In particular, as semiconductor manufacturing advances into the deep sub-micron stage, scaled-down devices and thinner gate oxides are more vulnerable to ESD stress.

Generally, the input-output pads on IC chips must at least sustain 2 KVolt ESD stress of high Human Body Mode (HBM) or 200V of Machine Mode (MM). Thus, the input-output pads on IC chips usually include ESD protection devices or circuits protecting the core circuit from ESD damage.

BRIEF SUMMARY OF THE INVENTION

In accordance with an embodiment of the disclosure, an electrostatic discharge (ESD) protection circuit protects a core circuit and comprises a first high electron mobility transistor (HEMT), a second HEMT, a first current clamping circuit, a second current clamping circuit, and a resistor. The first HEMT is coupled to a first input terminal. The second HEMT is coupled between the first HEMT and a second input terminal. The first current clamping circuit comprises a third HEMT. The third HEMT is coupled between the gate of the first HEMT and the second input terminal. The second current clamping circuit is coupled between the first input terminal and the gate of the second HEMT. The resistor is coupled between the first input terminal and the core circuit. The core circuit is coupled to the second input terminal.

In accordance with another embodiment of the disclosure, an electrostatic discharge protection circuit protects a core circuit and comprises a first HEMT, a second HEMT, a first current clamping circuit, a second current clamping circuit, and a resistor. The first HEMT is coupled to a first input terminal. The second HEMT is coupled between the first HEMT and a second input terminal. The first current clamping circuit is coupled between the second input terminal and the gate of the second HEMT. The second current clamping circuit is coupled between the first input terminal and the gate of the first HEMT. The resistor is coupled between the first input terminal and the core circuit.

In accordance with another embodiment of the disclosure, an electrostatic discharge protection circuit protects a core circuit and comprises an enhancement-mode HEMT, a first HEMT, a second HEMT, a first current clamping circuit, and a resistor. The enhancement-mode HEMT is coupled to the core circuit in parallel. The first HEMT is coupled to a first input terminal. The second HEMT is coupled to the first HEMT and a second input terminal. The first current clamping circuit comprises a third HEMT. The third HEMT is coupled to the first input terminal and the gate of the second HEMT. The resistor is coupled to the first input terminal and the gate of the enhancement-mode HEMT. The enhancement-mode HEMT is coupled to the second input terminal and a third input terminal.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
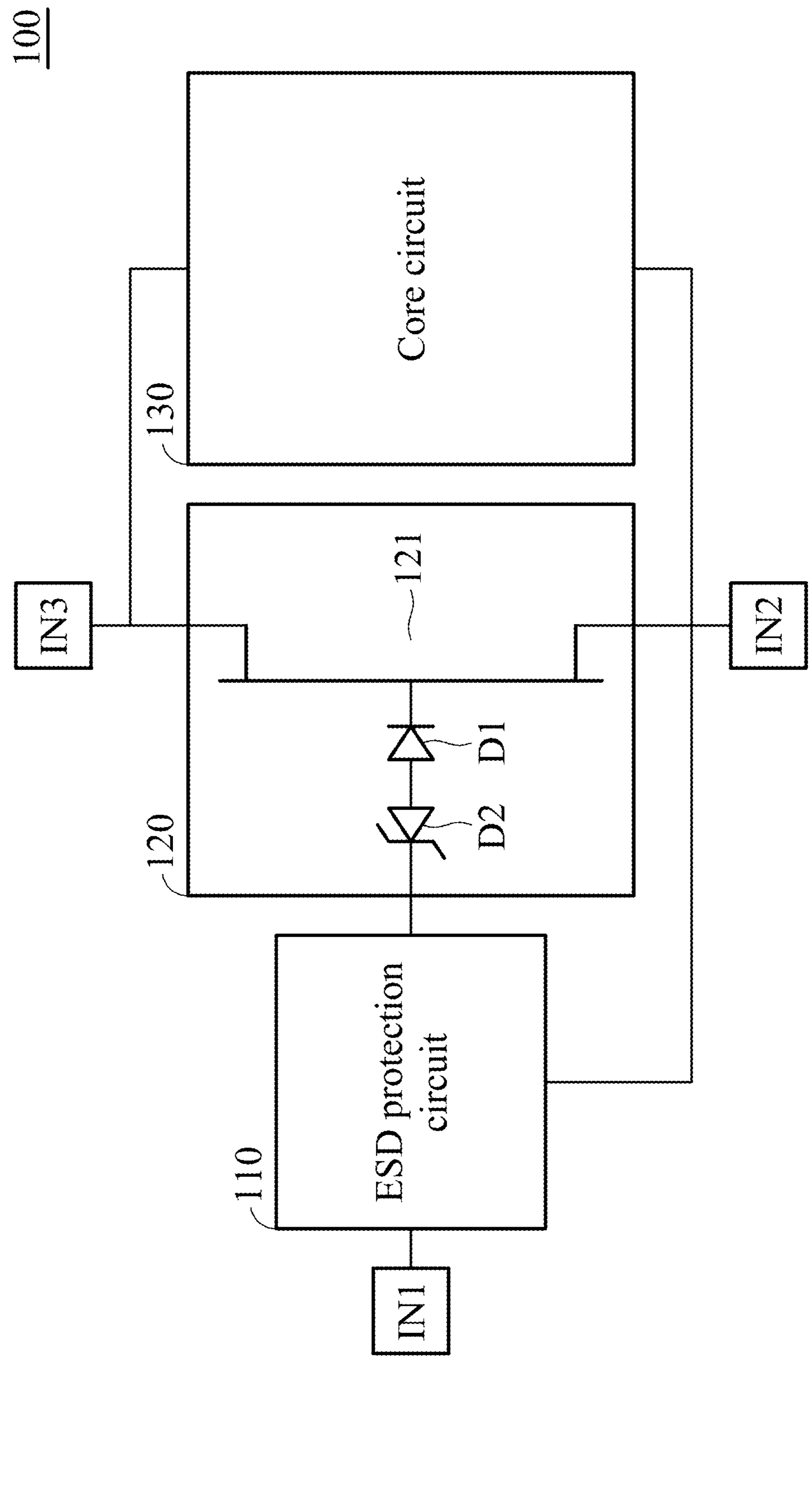
FIG. 1 is a schematic diagram of an exemplary embodiment of a control system according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of a control system according to various aspects of the present disclosure. The control system 100 further comprises an electrostatic discharge (ESD) protection circuit 110, and core circuits 120 and 130. The ESD protection circuit 110 is coupled to the input terminals IN1 and IN2, and the core circuit 120 to avoid an ESD current from entering the core circuit 120. For example, when an ESD event occurs on the input terminal IN1 and the input terminal IN2 receives a ground voltage, the ESD protection circuit 110 releases an ESD current to the input terminal IN2 from the input terminal IN1. In other embodiments, when an ESD event occurs on the input terminal IN2 and the input terminal IN1 receives a ground voltage, the ESD protection circuit 110 releases the ESD current to the input terminal IN1 from the input terminal IN2.

The core circuit 120 is coupled to the input terminals IN2 and IN3, and the ESD protection circuit 110. In this embodiment, the core circuit 120 has ESD releasing capability to prevent the ESD current from the input terminal IN2 or IN3 from entering the core circuit 130. For example, when an ESD event occurs on the input terminal IN3 and the input terminal IN2 receives a ground voltage, the core circuit 120 releases an ESD current to the input terminal IN2 from the input terminal IN3. Similarly, when an ESD event occurs on the input terminal IN2 and the input terminal IN3 receives a ground voltage, the core circuit 120 release an ESD current to the input terminal IN3 from the input terminal IN2.

The structure of core circuit 120 is not limited in the present disclosure. In one embodiment, the core circuit 120 comprises an enhancement-mode high electron mobility transistor (HEMT) 121. The drain of the enhancement-mode HEMT 121 is coupled to the input terminal IN3. The source of the enhancement-mode HEMT 121 is coupled to the input terminal IN2. The gate of the enhancement-mode HEMT 121 is coupled to the ESD protection circuit 110. As shown in FIG. 1, the enhancement-mode HEMT 121 comprises a diode D1 and a Schottky diode D2. The diode D1 and the Schottky diode D2 are connected back to back. The cathode of the Schottky diode D2 is provided as the gate of the enhancement-mode HEMT 121.

The core circuit 130 is coupled between the input terminals IN2 and IN3. When an ESD event occurs on the input terminal IN2 or IN3, since the core circuit 120 releases an ESD current from the input terminal IN2 or IN3, the core circuit 130 does not be damaged by the ESD current. Since each of the core circuit 120 and the ESD protection circuit 110 has ESD releasing capability, the core circuit 120 may be integrated into the ESD protection circuit 110.

The structures of core circuits 120 and 130 are not limited in the present disclosure. In some embodiments, when there is no ESD event, the ESD protection circuit 110 and the core circuit 120 stop working. At this time, the core circuit 130 works according to the signals or voltages of the input terminals IN2 and IN3. For example, the core circuit 130 may receive a first operation voltage from the input terminal IN3 and receive a second operation voltage from the input terminal IN2.

Figure 2A:
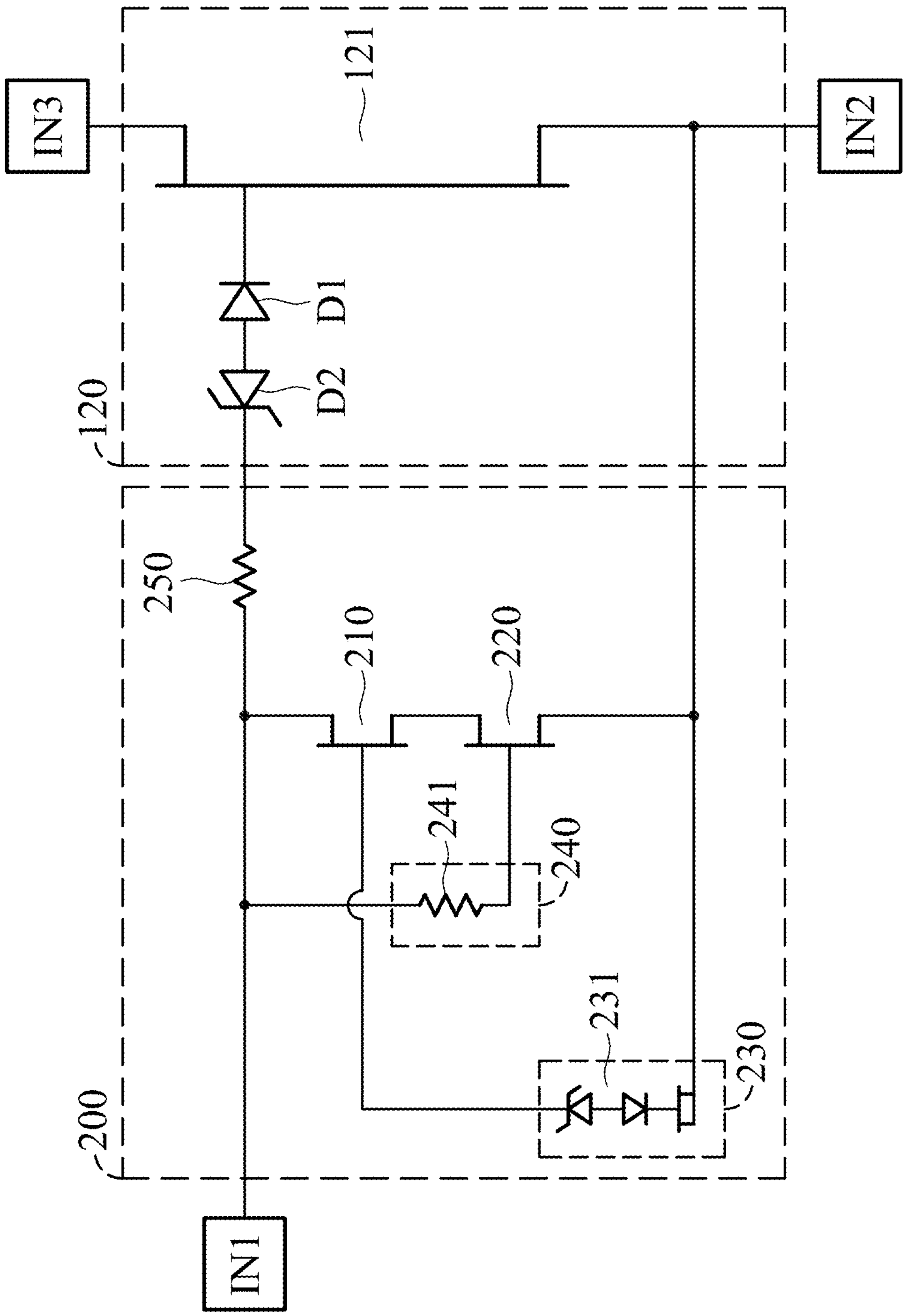
FIGS. 2A and 2B are schematic diagrams of other exemplary embodiments of the control system according to various aspects of the present disclosure.

FIG. 2A is a schematic diagrams of another exemplary embodiment of the control system according to various aspects of the present disclosure. For brevity, the core circuit 130 is not shown in FIG. 2A. The ESD protection circuit 200 comprises HEMTs 210 and 220, current clamping circuits 230 and 240, and a resistor 250. The resistor 250 is coupled between the input terminal IN1 and the core circuit 120. In this embodiment, the resistor 250 is close to the core circuit 120 to reduce the current entering the core circuit 120.

The HEMT 210 is coupled to the input terminal IN1. The HEMT 220 is coupled between the HEMT 210 and the input terminal IN2. Each of the HEMTs 210 and 220 has a diode (similar to the diode D1) and a Schottky diode (similar to the Schottky diode D2). For brevity, the back-to-back diode pairs of HEMTs 210 and 220 are not shown in FIG. 2A.

The current clamping circuit 230 is coupled between the input terminal IN2 and the HEMT 210 to clamp the current which enters the HEMT 210 from the input terminal IN2. In this embodiment, the current clamping circuit 230 comprises a HEMT 231. The drain and the source of the HEMT 231 are directly connected to the input terminal IN2. The gate of the HEMT 231 is directly connected to the gate of the HEMT 210. In some embodiments, the size of the HEMT 231 is smaller than the size of the HEMTs 210 or 220. In this case, the size of the HEMT 210 is similar to the size of the HEMT 220.

As shown in FIG. 2A, the HEMT 231 comprises a pair of diodes connected to back-to-back. The back-to-back diode pair of the HEMT 231 blocks the current from the input terminal IN2 from entering the HEMT 210 and ensures that the HEMT 210 is turned off when there is no ESD event to reduce the leakage current of the ESD protection circuit 200.

The current clamping circuit 240 is coupled between the input terminal IN1 and the gate of the HEMT 220. In this embodiment, the current clamping circuit 240 comprises a resistor 241. The resistor 240 is coupled between the input terminal IN1 and the gate of the HEMT 220 to reduce the current which enters the gate of the HEMT 220.

When an ESD event occurs on the input terminal IN1 and the input terminal IN2 receives a ground voltage, the gate voltage of the HEMT 210 is gradually increased due to the capacitive coupling effect of the parasitism capacitor between the drain and the gate of the HEMT 210. When the gate voltage of the HEMT 210 reaches a target value, the HEMT 210 is turned on. At this time, since the resistor 241 is coupled between the input terminal IN1 and the HEMT 220, the HEMT 220 is turned on. Therefore, an ESD current is released to the input terminal IN2 from the input terminal IN1 through the HEMTs 210 and 220.

Similarly, when an ESD event occurs on the input terminal IN2 and the input terminal IN1 receives a ground voltage, the gate voltage of the HEMT 220 is gradually increased due to the capacitive coupling effect of the parasitism capacitor between the drain and the gate of the HEMT 220. When the gate voltage of the HEMT 220 reaches a target value, the HEMT 220 is turned on. Since the ESD event turns on the HEMT 231, the gate voltage of the HEMT 210 is increased. When the gate voltage of the HEMT 210 reaches another target value, the HEMT 210 is turned on. Therefore, an ESD current is released to the input terminal IN1 from the input terminal IN2 through the HEMTs 220 and 210.

Since the ESD current enters the input terminal IN1 or IN2 through the HEMTs 210 and 220, it is ensured that the core circuit 120 does not be damaged by the ESD current. When there is no ESD events, the input terminal IN1 may receive a first predetermined voltage and the input terminal IN2 may receive a second predetermined voltage. When the second predetermined voltage is higher than the first predetermined voltage, the back-to-back diode pair of the HEMT 231 blocks the current from the input terminal IN2. Therefore, it is ensured the HEMT 210 is turned off. When the first predetermined voltage is higher than the second predetermined voltage, the resistor 241 reduces the current which enters the HEMT 220. Therefore, it is also ensured the HEMT 220 is turned off.

Figure 2B:
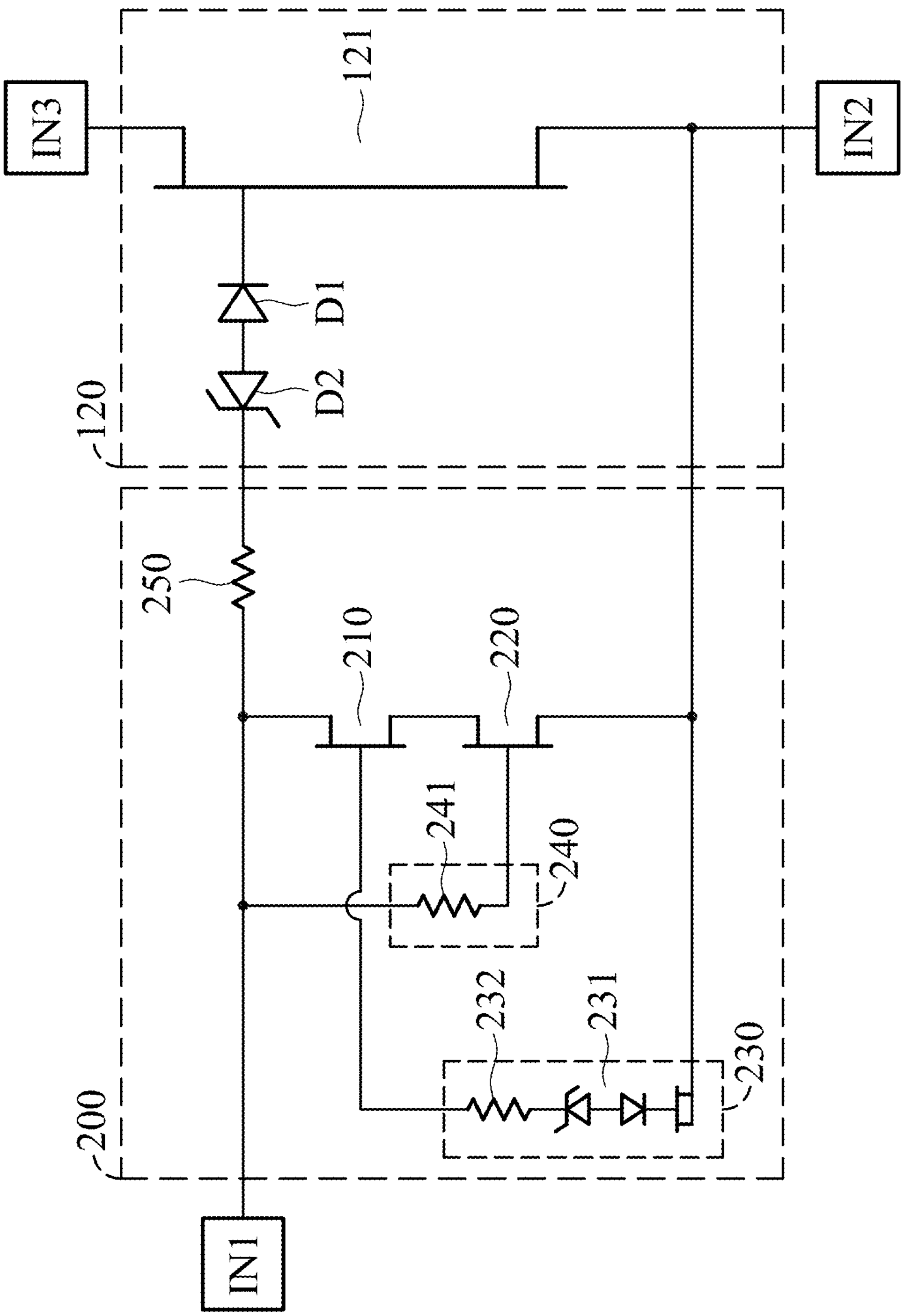

FIG. 2B is a schematic diagrams of another exemplary embodiment of the control system according to various aspects of the present disclosure. FIG. 2B is similar to FIG. 2A except that the current clamping circuit 230 further comprises a resistor 232. In this embodiment, the resistor 232 is coupled between the gate of the HEMT 231 and the gate of the HEMT 210. The resistor 232 reduces the current which enters the HEMT 210. Therefore, it is also ensured the HEMT 210 is completely turned off when there is no ESD event.

Figure 3A:
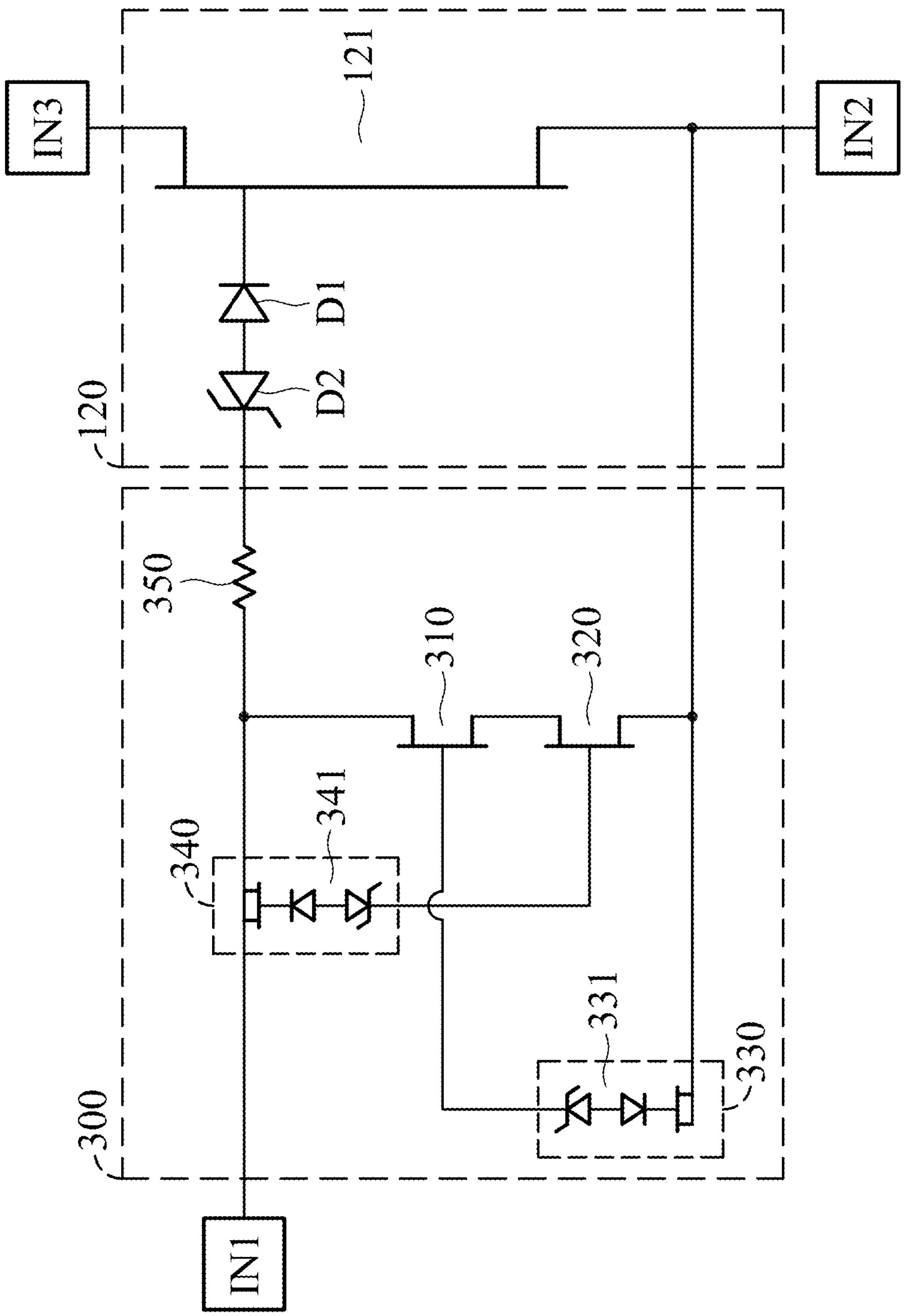
FIGS. 3A and 3B are schematic diagrams of other exemplary embodiments of the control system according to various aspects of the present disclosure.

FIG. 3A is a schematic diagrams of another exemplary embodiment of the control system according to various aspects of the present disclosure. In this embodiment, the ESD protection circuit 300 comprises HEMTs 310 and 320, current clamping circuits 330 and 340, and a resistor 350. Since the characteristic of the resistor 350 is similar to the characteristic of the resistor 250 shown in FIG. 2A, the related description is omitted here. The HEMT 310 is serially connected to the HEMT 320 between the input terminals IN1 and IN2. Since the characteristics of the HEMTs 310 and 320 are similar to the characteristics of the HEMTs 210 and 220 shown in FIG. 2A, the related description is omitted here.

The current clamping circuit 330 is coupled between the HEMT 310 and the input terminal IN2 and comprises a HEMT 331. Since the characteristic of the HEMT 331 is similar to the characteristic of the HEMT 231 shown in FIG. 2A, the related description is omitted here.

The current clamping circuit 340 is coupled between the input terminal IN1 and the gate of the HEMT 320. In this embodiment, the current clamping circuit 340 comprises a HEMT 341. The drain and the source of the HEMT 341 are coupled to the input terminal IN1. The gate of the HEMT 341 is coupled to the gate of the HEMT 320.

As shown in FIG. 3A, the HEMT 341 comprises a back-to-back diode pair. The back-to-back diode pair of the HEMT 341 avoid the current from the input terminal IN1 from entering the gate of the HEMT 320. Therefore, it is ensured that the HEMT 320 is turned off when there is no ESD event. The leakage current of the ESD protection circuit 300 is also reduced.

When an ESD event occurs on the input terminal IN1 and the input terminal IN2 receives a ground voltage, the gate voltage of the HEMT 310 is gradually increased due to the capacitive coupling effect of the parasitism capacitor between the drain and the gate of the HEMT 310. When the gate voltage of the HEMT 310 reaches a first target value, the HEMT 310 is turned on. At this time, since the ESD event turns on the HEMT 341, the gate voltage of the HEMT 320 is increased. When the gate voltage of the HEMT 320 reaches a second target value, the HEMT 320 is turned on. Therefore, an ESD current is released to the input terminal IN2 from the input terminal IN1 through the HEMTs 310 and 320.

Similarly, when an ESD event occurs on the input terminal IN2 and the input terminal IN1 receives a ground voltage, the gate voltage of the HEMT 320 is gradually increased due to the capacitive coupling effect of the parasitism capacitor between the drain and the gate of the HEMT 320. When the gate voltage of the HEMT 320 reaches a third target value, the HEMT 320 is turned on. At this time, the ESD event turns on the HEMT 331, the gate voltage of the HEMT 310 is increased. When the gate voltage of the HEMT 310 reaches a fourth target value, the HEMT 310 is turned on. Therefore, an ESD current is released to the input terminal IN1 from the input terminal IN2 through the HEMTs 320 and 310.

Since the ESD current enters the input terminal IN1 or IN2 through the HEMTs 310 and 320, it is ensured that the core circuit 120 does not be damaged by the ESD current. When there is no ESD events, the input terminal IN1 may receive a first predetermined voltage and the input terminal IN2 may receive a second predetermined voltage. When the second predetermined voltage is higher than the first predetermined voltage, the back-to-back diode pair of the HEMT 331 blocks the current from the input terminal IN2. Therefore, it is ensured the HEMT 310 is turned off. When the first predetermined voltage is higher than the second predetermined voltage, the back-to-back diode pair of the HEMT 341 blocks the current from the input terminal IN1. Therefore, it is ensured the HEMT 320 is turned off.

In a normal mode (no ESD event), since the HEMTs 331 and 341 avoid the current from entering the HEMTs 320 and 310, no leakage current passes through the HEMTs 310 and 320 to reduce the power consumption of the ESD protection circuit 300. In some embodiments, the size of each of the HEMTs 331 and 341 is smaller than the size of the HEMT 310 or 320. In this case, the size of the HEMT 331 is similar to the size of the HEMT 341, and the size of the HEMT 310 is similar to the size of the HEMT 320.

Figure 3B:
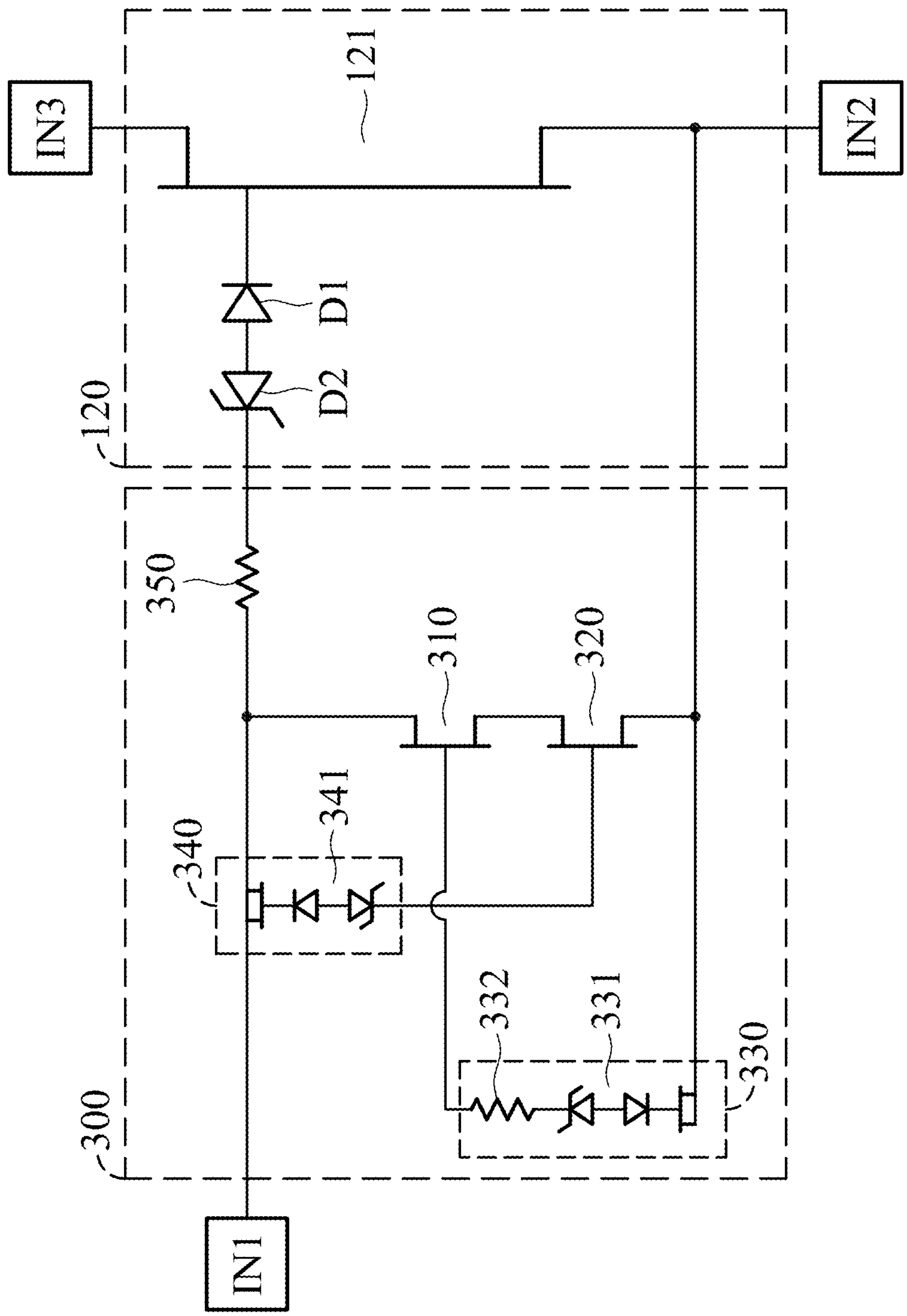

FIG. 3B is a schematic diagrams of another exemplary embodiment of the control system according to various aspects of the present disclosure. FIG. 3B is similar to FIG. 3A except that the current clamping circuit 330 further comprises a resistor 332. In this embodiment, the resistor 332 is coupled between the gate of the HEMT 331 and the gate of the HEMT 310. The resistor 332 is used to reduce the current which enters the HEMT 310. It is ensured that the HEMT 310 is completely turned off when there is no ESD event.

Figure 4A:
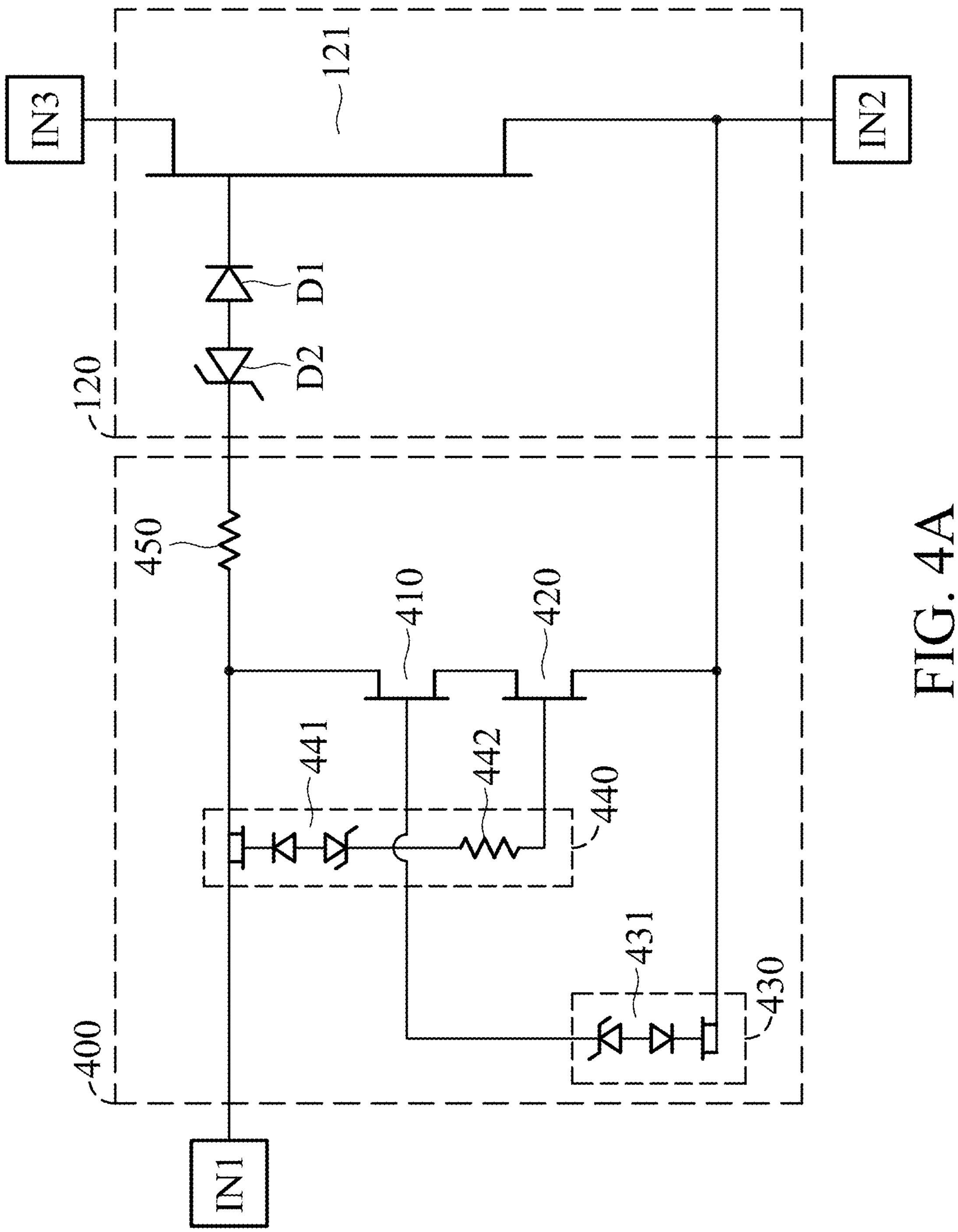
FIGS. 4A and 4B are schematic diagrams of other exemplary embodiments of the control system according to various aspects of the present disclosure.

FIG. 4A is a schematic diagrams of another exemplary embodiment of the control system according to various aspects of the present disclosure. In this embodiment, the ESD protection circuit 400 comprises HEMTs 410 and 420, the current clamping circuits 430 and 440, and a resistor 450. Since the characteristic of the resistor 450 is similar to the characteristic of the resistor 250 shown in FIG. 2A, the related description is omitted here. The HEMT 410 is serially coupled to the HEMT 420 between the input terminals IN1 and IN2. Since the characteristics of the HEMTs 410 and 420 are similar to the characteristics of the HEMTs 210 and 220 shown in FIG. 2A, the related description is omitted here.

The current clamping circuit 430 is coupled between the HEMT 410 and the input terminal IN2. Since the characteristic of the HEMT 431 is similar to the characteristic of the HEMT 231 shown in FIG. 2A, the related description is omitted here.

The current clamping circuit 440 is coupled between the input terminal IN1 and the gate of the HEMT 420. In this embodiment, the current clamping circuit 440 comprises a HEMT 441 and a resistor 442. The drain and the source of the HEMT 441 are coupled to the input terminal IN1. The resistor 442 is coupled between the gate of the HEMT 341 and the gate of the HEMT 420.

In a normal mode (there is no ESD event), the HEMT 441 and the resistor 442 avoid the current from the input terminal IN1 from entering the gate of the HEMT 420. Since the HEMT 420 is turned off, no current passes through the HEMTs 410 and 420.

Figure 4B:
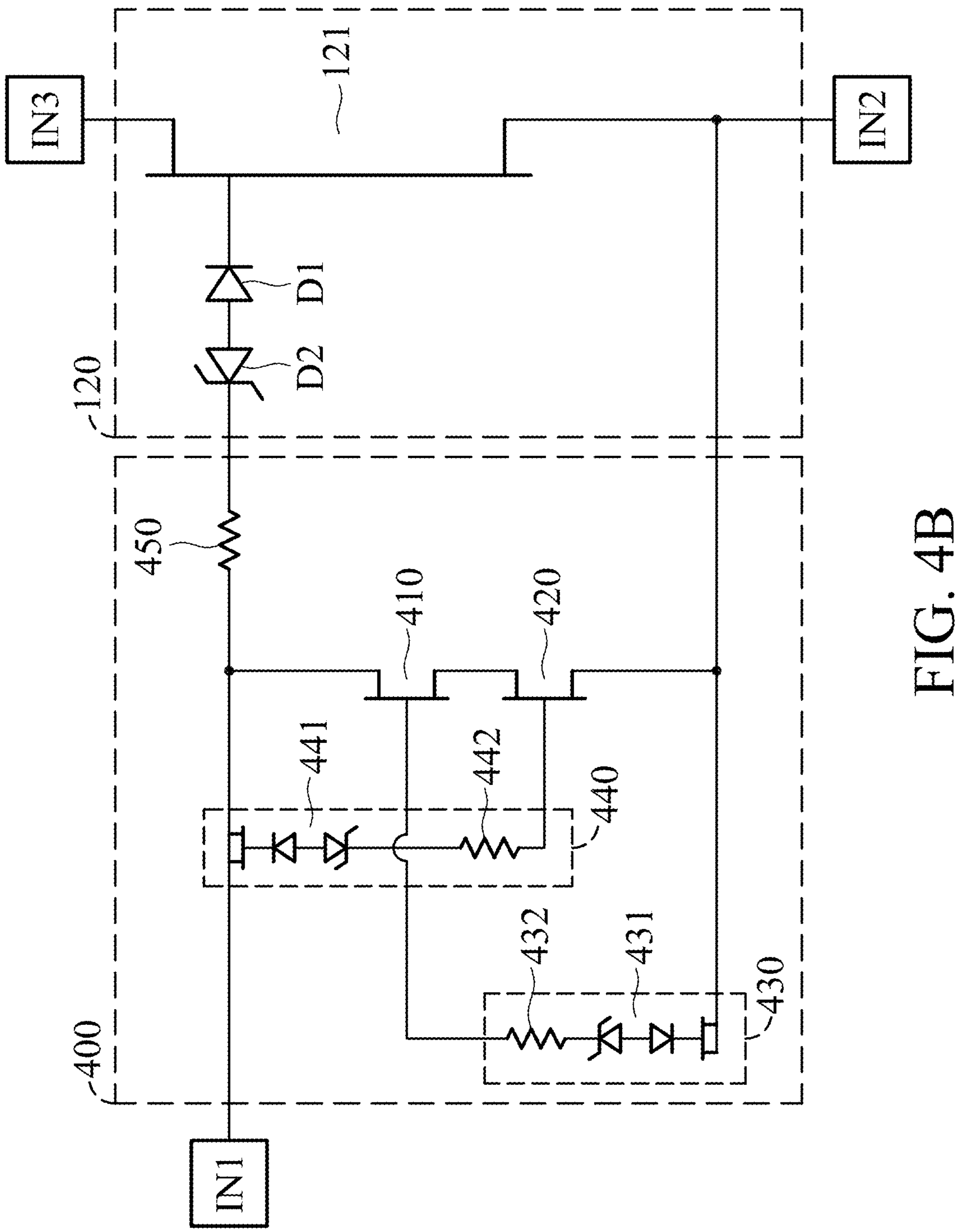

FIG. 4B is a schematic diagrams of another exemplary embodiment of the control system according to various aspects of the present disclosure. FIG. 4B is similar to FIG. 4A except that the current clamping circuit 430 further comprises a resistor 432. In this embodiment, the resistor 432 is coupled between the gate of the HEMT 431 and the gate of the HEMT 410. The resistor 432 is used to reduce the current which enters the HEMT 410. It is ensured that the HEMT 410 is completely turned off when there is no ESD event.

Figure 5A:
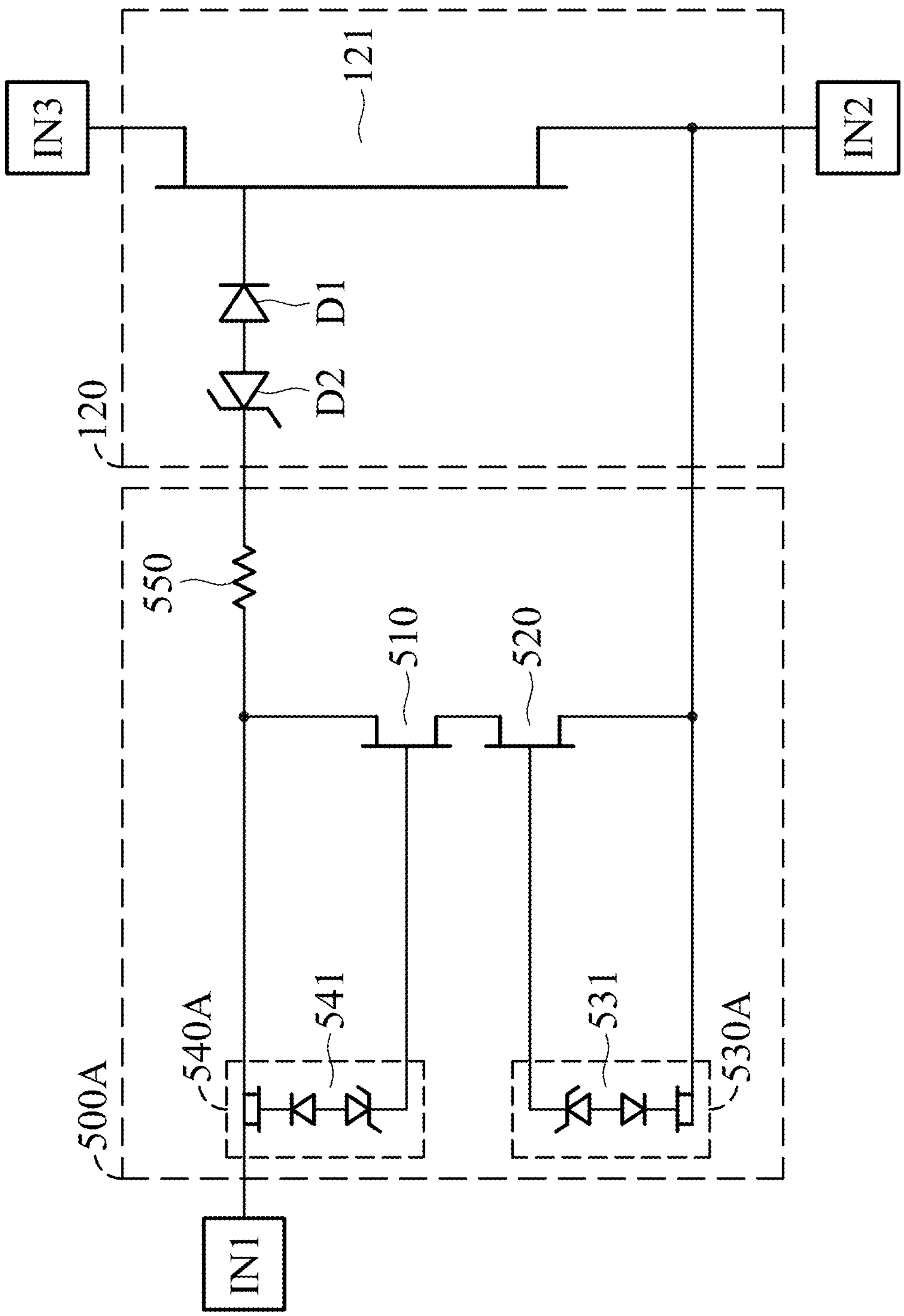
FIG. 5A~5D are schematic diagrams of other exemplary embodiments of the control system according to various aspects of the present disclosure.

FIG. 5A is a schematic diagrams of another exemplary embodiment of the control system according to various aspects of the present disclosure. The ESD protection circuit 500A is coupled between the input terminal IN1 and the core circuit 120 to avoid an ESD current from the input terminal IN1 from entering the core circuit 120. In this embodiment, the ESD protection circuit 500A comprises HEMTs 510 and 520, current clamping circuits 530A and 540A, and a resistor 550.

The HEMT 510 is coupled to the input terminal IN1. The HEMT 520 is coupled between the HEMT 510 and the input terminal IN2. The resistor 550 is coupled between the input terminal IN1 and the core circuit 120. Since the characteristics of the HEMTs 510 and 520, and the resistor 550 are similar to the characteristics of the HEMTs 210 and 220, and the resistor 250 shown in FIG. 2A, the related description is omitted here.

When an ESD event occurs on the input terminal IN1 and the input terminal IN2 receives a ground voltage, the gate voltage of the HEMT 510 is gradually increased due to the capacitive coupling effect of the parasitism capacitor between the drain and the gate of the HEMT 510. When the gate voltage of the HEMT 510 reaches a first target value, the HEMT 510 is turned on. Therefore, the drain voltage of the HEMT 520 is increased. At this time, the gate voltage of the HEMT 520 is gradually increased due to the capacitive coupling effect of the parasitism capacitor between the drain and the gate of the HEMT 520. When the gate voltage of the HEMT 520 reaches a second target value, the HEMT 520 is turned on. Since the HEMTs 510 and 520 are turned on, an ESD current is released to the input terminal IN2 from the input terminal IN1 and passes through the HEMTs 510 and 520. Since no ESD current enters the core circuit 120, it is ensured that the core circuit 120 does not be damaged by the ESD current.

When an ESD event occurs on the input terminal IN3 and the input terminal IN2 receives a ground voltage, the enhancement-mode HEMT 121 of the core circuit 120 releases an ESD current to the input terminal IN2 from the input terminal IN3. Similarly, when an ESD event occurs on the input terminal IN2 and the input terminal IN3 receives a ground voltage, the enhancement-mode HEMT 121 releases an ESD current to the input terminal IN3 from the input terminal IN2.

The current clamping circuit 530A is coupled between the input terminal IN2 and the gate of the HEMT 520. In this embodiment, the current which enters the gate of the HEMT 520 is limited by the current clamping circuit 530A. When there is no ESD event, the current clamping circuit 530A blocks the current from the input terminal IN2 from entering the gate of the HEMT 520. Therefore, the HEMT 520 is completely turned off to reduce the leakage current of the ESD protection circuit 500A.

The structure of the current clamping circuit 530A is not limited in the present disclosure. Any circuit can serve as the current clamping circuit 530A, as long as the circuit is capable of blocking current. In this embodiment, the current clamping circuit 530A is a HEMT 531. The source and the drain of the HEMT 531 are coupled to the input terminal IN2. The gate of the HEMT 531 is coupled to the gate of the HEMT 520. In this case, the HEMT 531 comprises a back-to-back diode pair to block the current from the input terminal IN2 from entering the gate of the HEMT 520.

The current clamping circuit 540A is coupled between the input terminal IN1 and the gate of the HEMT 510. In this embodiment, the current which enters the gate of the HEMT 510 is limited by the current clamping circuit 540A. When there is no ESD event, the current clamping circuit 540A blocks the current from the input terminal IN1 from entering the gate of the HEMT 510. Therefore, the HEMT 510 is completely turned off to reduce the leakage current of the ESD protection circuit 500A.

The structure of the current clamping circuit 540A is not limited in the present disclosure. Any circuit can serve as the current clamping circuit 540A, as long as the circuit is capable of blocking current. In this embodiment, the current clamping circuit 540A is a HEMT 541. The source and the drain of the HEMT 541 are coupled to the input terminal IN1. The gate of the HEMT 541 is coupled to the gate of the HEMT 510. In this case, the HEMT 541 comprises a back-to-back diode pair to block the current from the input terminal IN1 from entering the gate of the HEMT 510.

Figure 5B:
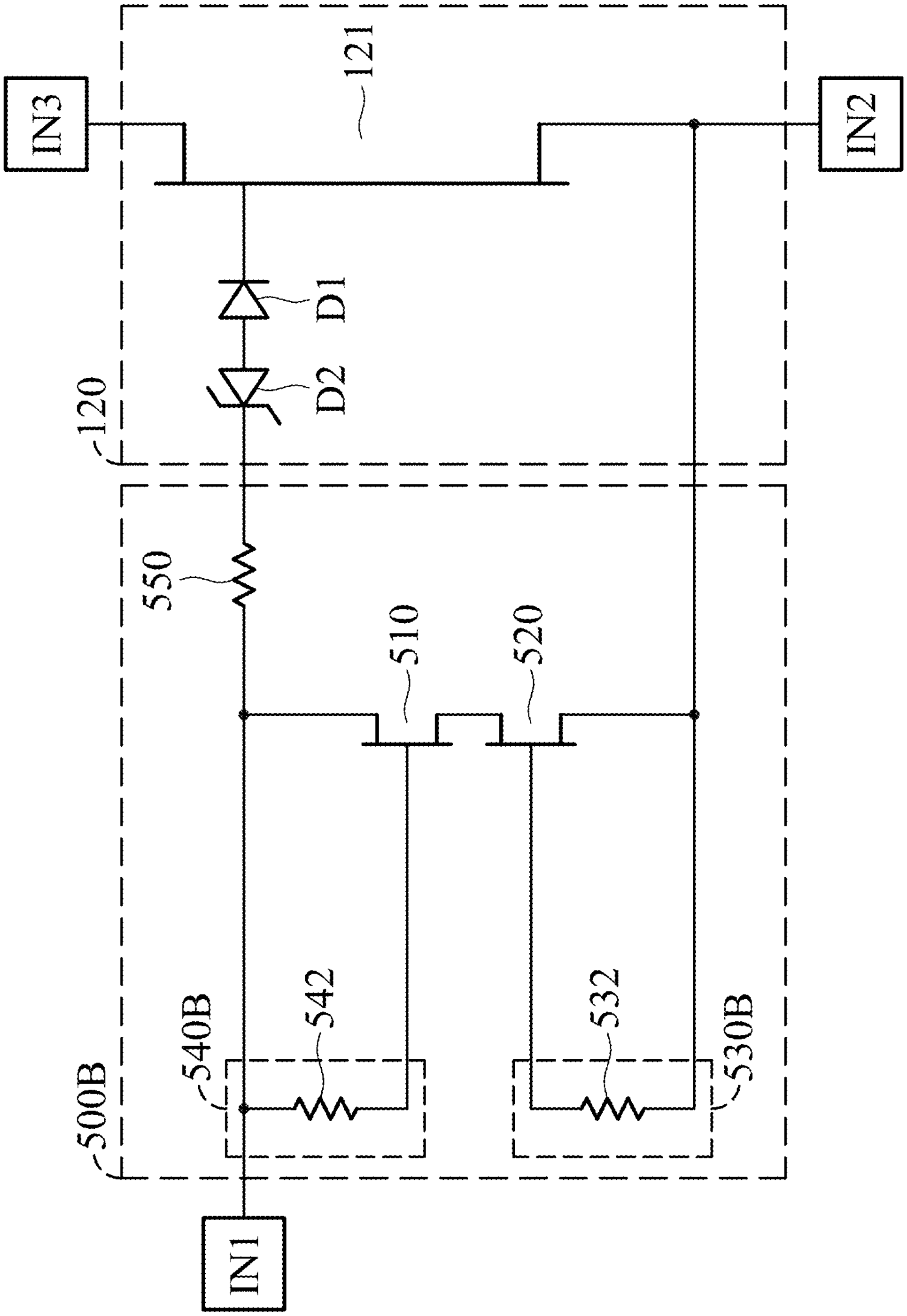

FIG. 5B is a schematic diagrams of another exemplary embodiment of the control system according to various aspects of the present disclosure. FIG. 5B is similar to FIG. 5A except that the structures of the current clamping circuits 530B and 540B shown in FIG. 5B are different from the structures of the current clamping circuits 530A and 540A shown in FIG. 5A. In this embodiment, the current clamping circuit 530B comprises a resistor 532. The current clamping circuit 540B comprises a resistor 542.

The resistor 532 is directly connected between the input terminal IN2 and the gate of the HEMT 520 to reduce the current which enters the gate of the HEMT 520 from the input terminal IN2. The resistor 542 is directly connected between the input terminal IN1 and the gate of the HEMT 510 to reduce the current which enters the gate of the HEMT 510 from the input terminal IN1. Since the currents entering the gates of the HEMTs 510 and 520 are limited by the resistors 542 and 543, it is ensured that the HEMTs 510 and 520 are turned off when there is no ESD event.

Figure 5C:
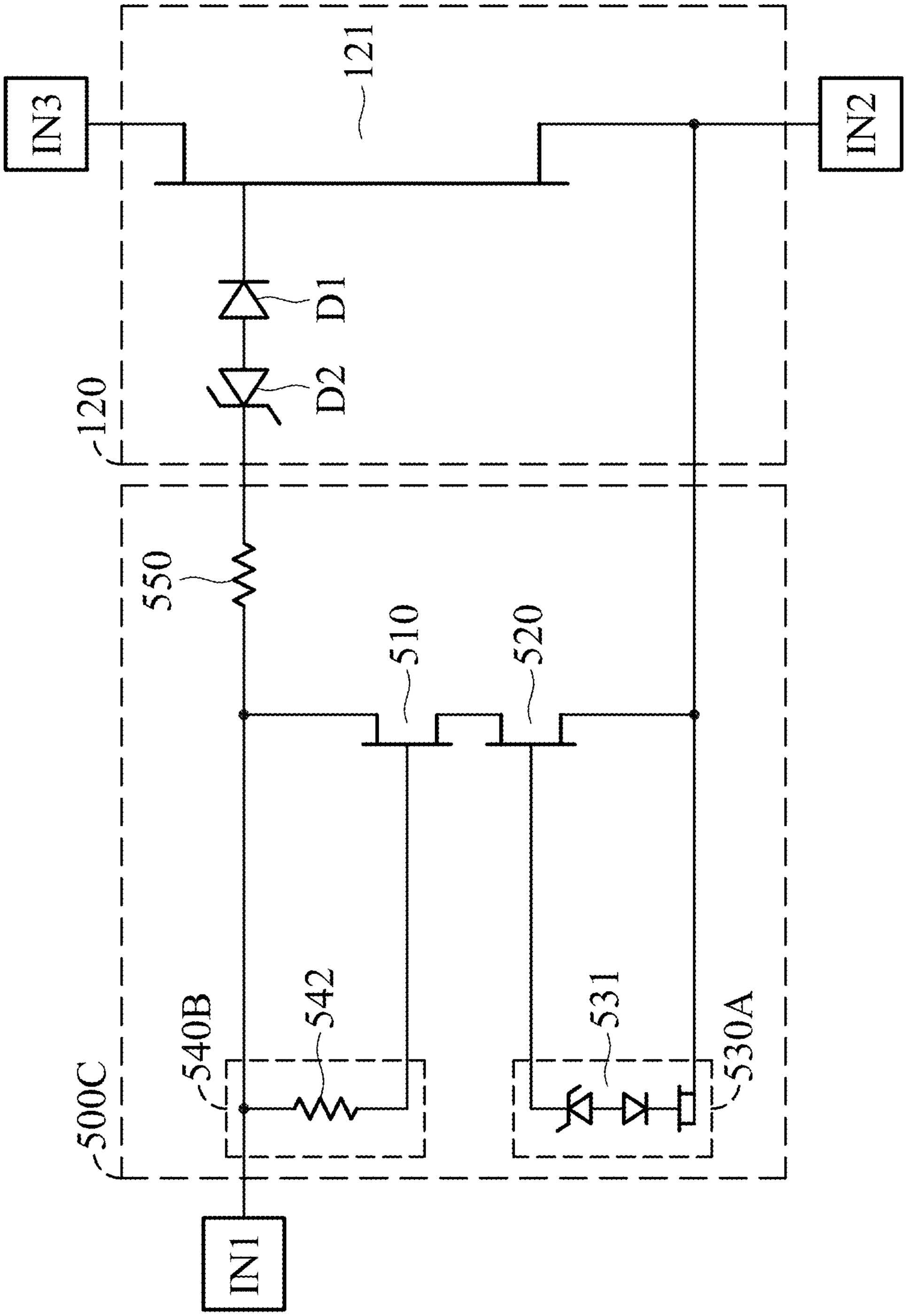

FIG. 5C is a schematic diagrams of another exemplary embodiment of the control system according to various aspects of the present disclosure. The ESD protection circuit 500C comprises the HEMTs 510 and 520, the current clamping circuits 530A and 540B and the resistor 550. Since the characteristics of the HEMTs 510 and 520, the current clamping circuits 530A and 540B, and the resistor 550 are discussed previously, the related description is omitted here. Since the currents entering the gates of the HEMTs 510 and 520 are limited by the current clamping circuits 540B and 530A, it is ensured that the HEMTs 510 and 520 are turned off when there is no ESD event.

Figure 5D:
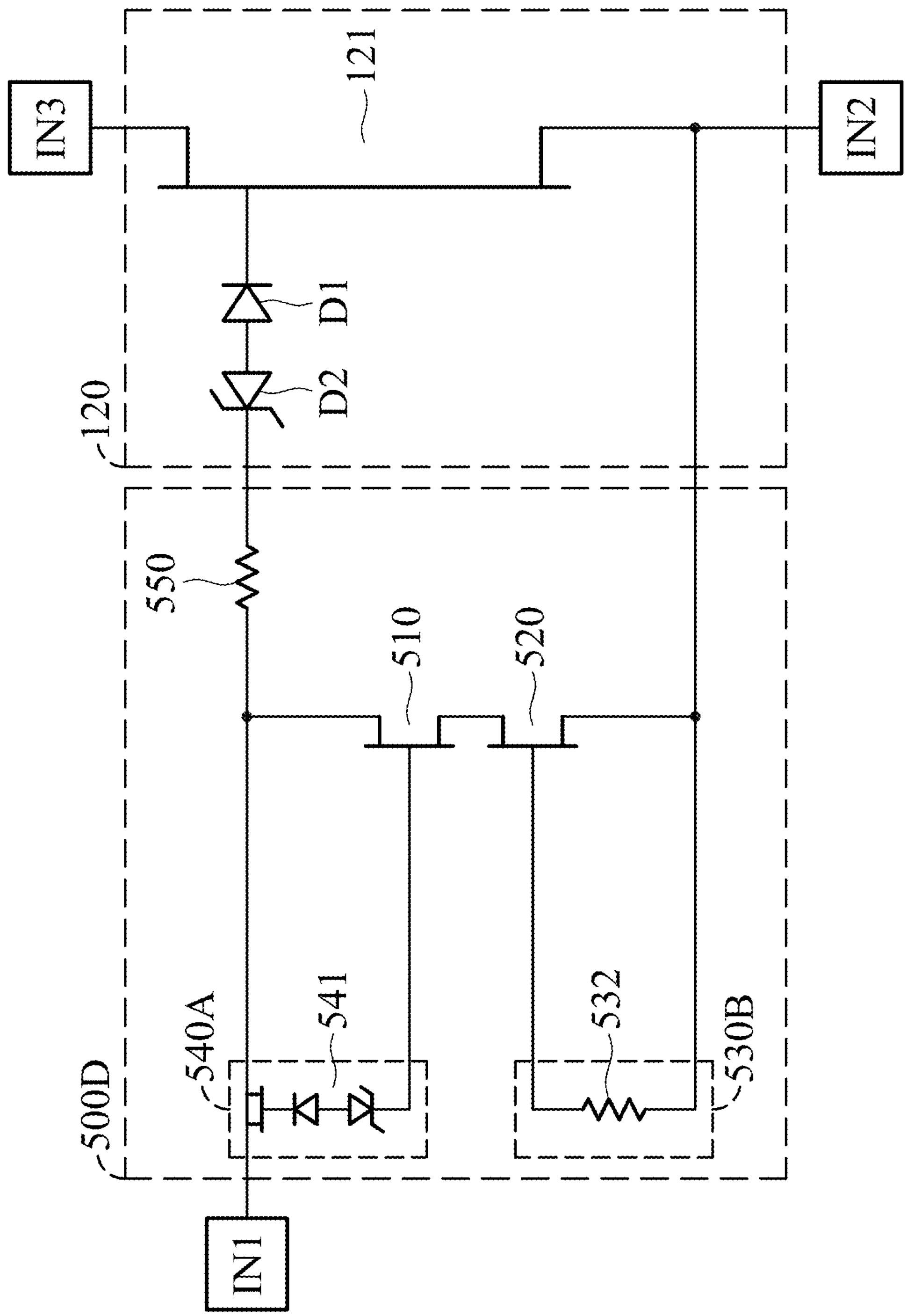

FIG. 5D is a schematic diagrams of another exemplary embodiment of the control system according to various aspects of the present disclosure. The ESD protection circuit 500D comprises the HEMTs 510 and 520, the current clamping circuits 530B and 540A and the resistor 550. Since the characteristics of the HEMTs 510 and 520, the current clamping circuits 530B and 540A, and the resistor 550 are discussed previously, the related description is omitted here. Since the currents entering the gates of the HEMTs 510 and 520 are limited by the current clamping circuits 540A and 530B, it is ensured that the HEMTs 510 and 520 are turned off when there is no ESD event.

It will be understood that when an element is referred to as being "coupled to" another element, it can be directly coupled to the other element or intervening elements may be present. In contrast, when an element is referred to as be "directly connected to" another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another. In the following claims, the terms "first," "second," etc. are used merely as labels, and are not intended to impose numerical requirements on their objects.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrostatic discharge (ESD) protection circuit for protecting a core circuit, comprising:
a first high electron mobility transistor (HEMT) coupled to a first input terminal;
a second HEMT coupled between the first HEMT and a second input terminal;
a first current clamping circuit comprising:
a third HEMT coupled between a gate of the first HEMT and the second input terminal;
a second current clamping circuit coupled between the first input terminal and a gate of the second HEMT; and
a first resistor coupled between the first input terminal and the core circuit,
wherein the core circuit is coupled to the second input terminal, and the size of the first HEMT or the second HEMT is larger than the size of the third HEMT.

2. The ESD protection circuit as claimed in claim 1, wherein a drain and a source of the third HEMT are coupled to the second input terminal, and a gate of the third HEMT is coupled to the gate of the first HEMT.

3. The ESD protection circuit as claimed in claim 2, wherein the first current clamping circuit further comprises:
a second resistor coupled between the gate of the third HEMT and the gate of the first HEMT.

4. The ESD protection circuit as claimed in claim 3, wherein the second current clamping circuit comprises:
a third resistor coupled between the first input terminal and the gate of the second HEMT.

5. The ESD protection circuit as claimed in claim 3, wherein the second current clamping circuit comprises:
a fourth HEMT comprising a drain, s source, and a gate, wherein the drain and the source of the fourth HEMT are coupled to the first input terminal, and the gate of the fourth HEMT is coupled to the gate of the second HEMT.

6. The ESD protection circuit as claimed in claim 5, wherein the second current clamping circuit further comprises:
a third resistor coupled between the gate of the fourth HEMT and the gate of the second HEMT.

7. The ESD protection circuit as claimed in claim 2, wherein the second current clamping circuit comprises:
a fourth HEMT comprising a drain, a source, and a gate, wherein the drain and the source of the fourth HEMT are coupled to the first input terminal, and the gate of the fourth HEMT is coupled to the second HEMT.

8. The ESD protection circuit as claimed in claim 2, wherein the second current clamping circuit comprises:
a third resistor coupled between the first input terminal and the gate of the second HEMT.

9. The ESD protection circuit as claimed in claim 2, wherein the second current clamping circuit comprises:
a fourth HEMT comprising a drain coupled to the first input terminal and further comprising a source coupled to the first input terminal; and
a third resistor coupled between a gate of the fourth HEMT and the gate of the second HEMT.

10. The ESD protection circuit as claimed in claim 1, wherein in response to an ESD event occurring on the first input terminal or the second input terminal, the first HEMT and the second HEMT are turned on to avoid an ESD current from entering the core circuit.

11. An ESD protection circuit for protecting a core circuit, comprising:
a first HEMT coupled to a first input terminal;
a second HEMT coupled between the first HEMT and a second input terminal;
a first current clamping circuit coupled between the second input terminal and a gate of the second HEMT, and comprising:
a third HEMT comprising a drain, a source, and a gate;
a second current clamping circuit coupled between the first input terminal and a gate of the first HEMT; and
a first resistor coupled between the first input terminal and the core circuit,
wherein:
the drain and the source of the third HEMT are coupled to the second input terminal, and the gate of the third HEMT is coupled to the gate of the second HEMT, and
the size of the first HEMT or the second HEMT is larger than the size of the third HEMT.

12. The ESD protection circuit as claimed in claim 11, wherein the second current clamping circuit comprises:
a fourth HEMT comprising a drain, a source, and a gate, wherein the drain and the source of the fourth HEMT are coupled to the first input terminal, and the gate of the fourth HEMT is coupled to the gate of the first HEMT.

13. The ESD protection circuit as claimed in claim 11, wherein the second current clamping circuit comprises:
a second resistor directly connected to the first input terminal and the gate of the first HEMT.

14. The ESD protection circuit as claimed in claim 11, wherein the first current clamping circuit comprises:
a third resistor directly connected to the second input terminal and the gate of the second HEMT.

15. The ESD protection circuit as claimed in claim 14, wherein the second current clamping circuit comprises:
a second resistor directly connected to the first input terminal and the gate of the first HEMT.

16. The ESD protection circuit as claimed in claim 14, wherein the second current clamping circuit comprises:
a fourth HEMT comprising a drain, a source, and a gate, wherein the drain and the source of the fourth HEMT are coupled to the first input terminal, and the gate of the fourth HEMT is coupled to the gate of the first HEMT.

17. An ESD protection circuit for protecting a core circuit, comprising:
an enhancement-mode HEMT coupled to the core circuit in parallel;
a first HEMT coupled to a first input terminal;
a second HEMT coupled to the first HEMT and a second input terminal;
a first current clamping circuit comprising:
a third HEMT coupled to the first input terminal and a gate of the second HEMT; and
a first resistor coupled to the first input terminal and a gate of the enhancement-mode HEMT,
wherein the enhancement-mode HEMT is coupled to the second input terminal and a third input terminal, and the size of the first HEMT or the second HEMT is larger than the size of the third HEMT.

18. The ESD protection circuit as claimed in claim 17, wherein:
in response to an ESD event occurring on the first input terminal and the second input terminal receiving a ground voltage, the first HEMT and the second HEMT are turned on to avoid an ESD current from entering the enhancement-mode HEMT from the first input terminal,
in response to the ESD event occurring on the third input terminal and the second input terminal receiving the ground voltage, the enhancement-mode HEMT releases the ESD current to the second input terminal from the third input terminal, in response to the ESD event occurring on the second input terminal and the third input terminal receiving the ground voltage, the enhancement-mode HEMT releases the ESD current to the third input terminal from the second input terminal.

* * * * *